Aug. 8, 1933.      G. M. KRIEGBAUM ET AL      1,921,885
FERTILIZER ATTACHMENT FOR PLANTERS
Filed June 8, 1931        2 Sheets-Sheet 1
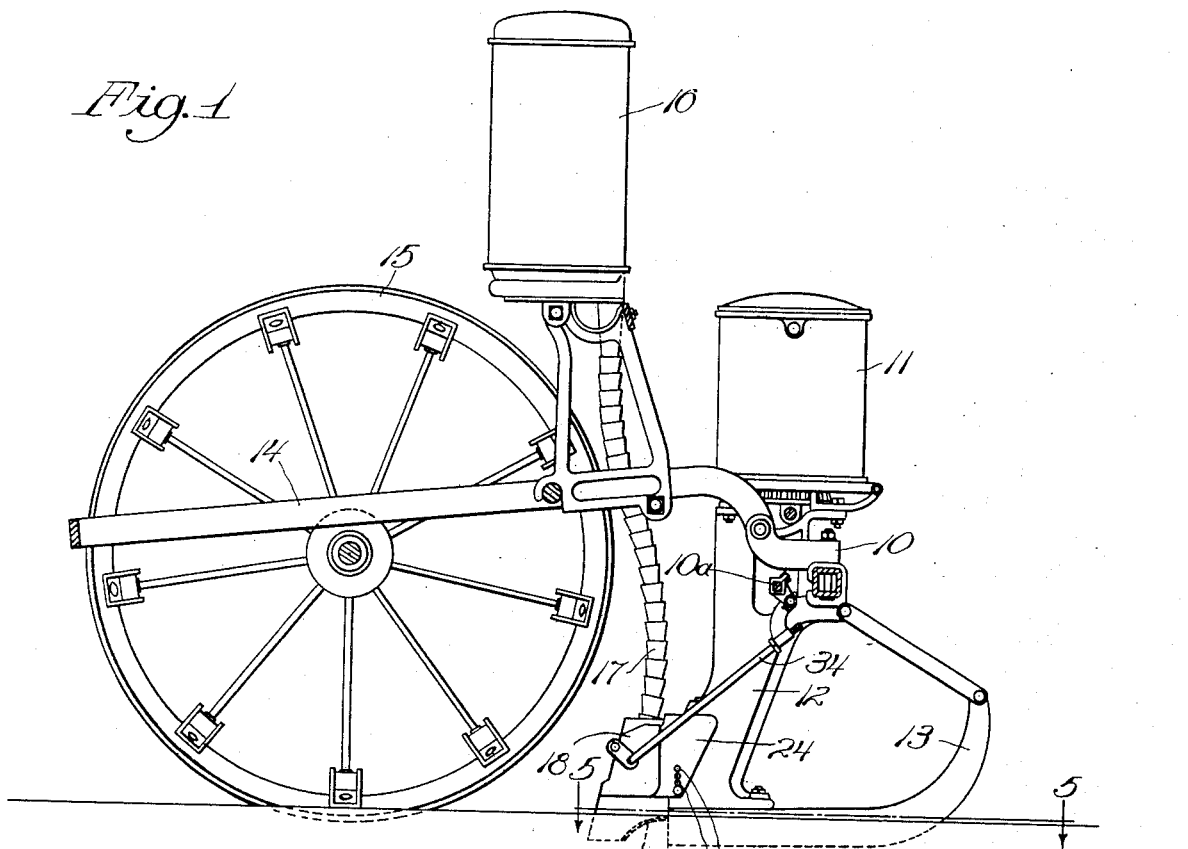
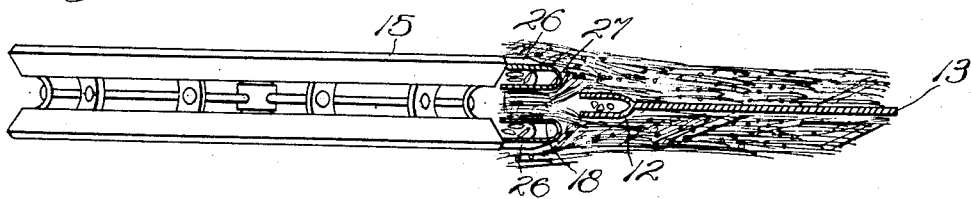
Inventors
George M. Kriegbaum
Fred F. Brooks
Clarence C. Haas
By [signature] Atty.

Aug. 8, 1933.                G. M. KRIEGBAUM ET AL                1,921,885
                         FERTILIZER ATTACHMENT FOR PLANTERS
                              Filed June 8, 1931                2 Sheets-Sheet 2
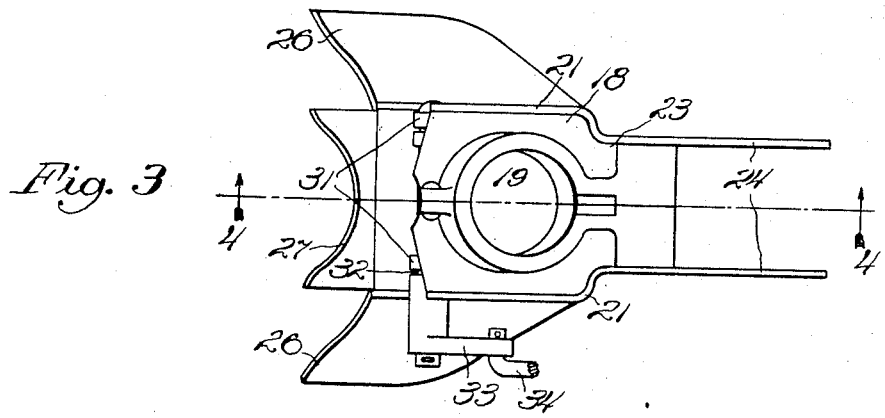
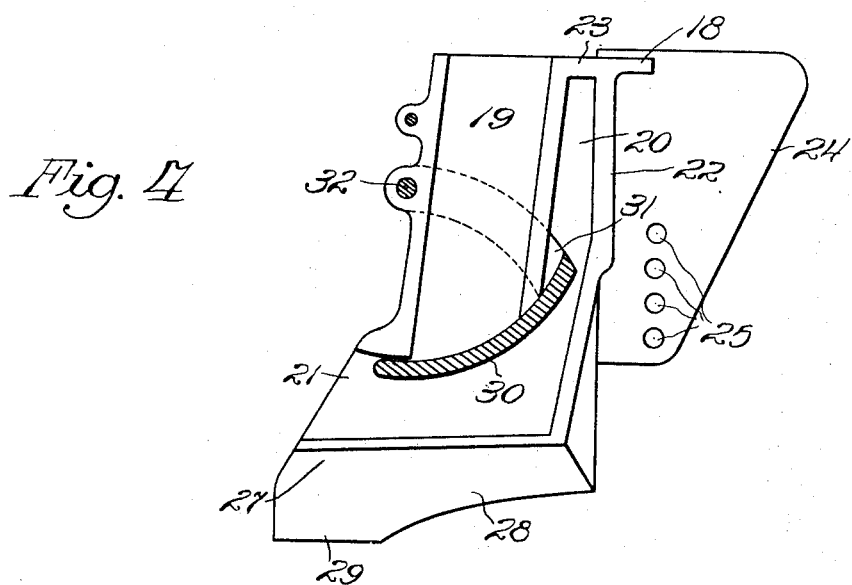
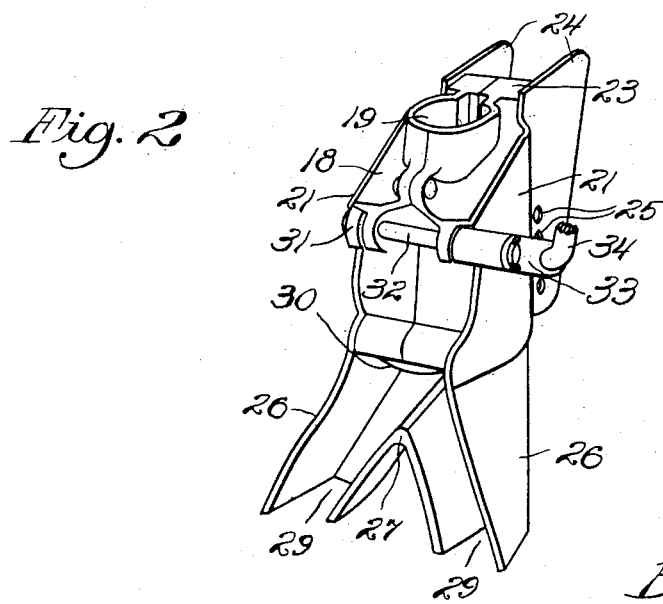

Patented Aug. 8, 1933

1,921,885

UNITED STATES PATENT OFFICE 1,921,885

FERTILIZER ATTACHMENT FOR PLANTERS

George M. Kriegbaum, Fred F. Brooks, and Clarence C. Haas, Richmond, Ind., assignors to International Harvester Company, a Corporation of New Jersey Application June 8, 1931. Serial No. 542,732

6 Claims. (Cl. 111—73)

The present invention relates particularly to fertilizer depositing devices for use in combination with the seed depositing mechanism of planters.

The main object of the invention is to provide a combination of seed planting, fertilizer depositing and covering means constructed and arranged so that the seed and fertilizer will be deposited in different furrows at different levels or at the same level and the separation be preserved after the covering operation is complete.

Another object of the invention is to provide a fertilizer depositing device which will cooperate with the seed depositing and covering means of a planter in such a manner as to cause the fertilizer to be deposited in separate furrows at each side of a central furrow in which seed is deposited and cause the seed and fertilizer to be covered with soil in such a way as to prevent mixing of the fertilizer and seed.

A further object is to provide a fertilizer depositing device adapted to be used in connection with corn planter boots of existing types, which will operate as a combined seed covering and furrow forming unit and deliver the fertilizer in the furrows formed.

The foregoing objects as well as other improvements and advantages are attained by organization and details of construction hereinafter described in detail and claimed, and illustrated in the accompanying drawings where—

Figure 1 is a side view of a combined planter and fertilizer distributor embodying the invention;

Figure 2 is a perspective of the fertilizer depositing unit viewed from the rear;

Figure 3 is a plan view of that unit;

Figure 4 is an inner side elevation of one lateral half of the unit parted on the line 4—4 of Figure 3 with the valve shown in section;

Figure 5 is a view taken on line 5—5 of Figure 1, showing the relative positions of the seed and fertilizer discharging channels and their effect on the soil, together with the location of the covering and packing wheel with respect to Figure 6 is a diagrammatic view showing the locations of the seed and fertilizer in the soil after deposit and before the covering and packing wheel has passed thereover; and, Figure 7 is a similar view showing the positions of seed and fertilizer after the planting operation is completed.

In the present instance the invention is disclosed in connection with a check-row corn planter having the usual front frame 10 carrying the seed hoppers and dispensing mechanism 11 supported on the customary seed boots 12 and furrow opening runners 13, and the rear frame 14 supported on the covering wheels 15 following in the path of the runners. The seed boots contain the second drop valves operated in the usual way by the rockshaft 10ª.

In the practice of the present invention a fertilizer hopper 16 is mounted upon the planter frame behind the seed hopper and the fertilizer discharges into a flexible tube or conduit 17 leading to a depositing unit secured to the planter boot and designated generally by the numeral 18.

The novel fertilizer depositing unit is formed as a hollow casing which may be cast as two lateral halves suitably secured together. The upper portion of the casing is formed with an inner tubular portion into which the lower end of the flexible conduit 17 extends. This tubular portion is surrounded at the sides and front by an outer chamber 20 which is closed on all sides except at the bottom by side walls 21, front wall 22, and top wall 23, the rear side of the tubular portion 19 itself forming part of the rear wall. The side walls 21 are extended forwardly as parallel plates or wings 24, which are adapted to contact with the sides of the planter boot and are provided with means, such as a series of vertically spaced bolt openings 25, for connecting it with the planter boot at desired adjustment. The walls of the casing are extended downwardly below the end of the tubular portion to form the lower or soil engaging portion of the unit. In general this lower portion of the unit may be described as consisting of two rearwardly and outwardly inclined chutes or conduits 26 and 27 forming a continuation of the outer chamber 20 and opening to the soil at the bottom and rear of the unit. The two chutes or conduits are formed between the outwardly flared skirt pieces 26, forming downward extensions of the side walls 21 of the casing, and a central, inverted V-shaped, dividing channel 27 which may be said to form a continuation of the front wall 22 of the casing. The inclined sides of the channel 27 and the skirt pieces 26 accordingly form, respectively, the inner and outer walls of downwardly diverging ground engaging branches or chutes, and these walls merge forwardly and below to form a rounded runner-like under side 28 inclining from front to rear until cut off to form the bottom outlet 29 of each chute. The lower end of the tubular inner chamber 19 is normally closed by a swinging closure or valve plate 30 (Figure 4) housed within the outer chamber 20 and connected by crank arms 31 at either side of the tubular chamber 19 to a rockshaft 32 journaled in suitable lugs on the back of the distributor unit, as best seen in Figure 2. One end of shaft 32 is provided with a crank arm 33 connected by a link 34 (Figure 1) with the check-row shaft 10ᵃ of the planter. The actuation of the seed and fertilizer dropping valves will, therefore, be simultaneous.

The peculiar bottom contour of the distributor unit accordingly provides two inclined runner-like chute bottoms terminating in laterally spaced outlets for fertilizer, separated by a central upwardly arched or inverted V-shaped dividing channel which acts on the soil, over which it is drawn, as a covering or ridge forming element closing the furrow formed by the planter runner ahead.

When in position on the planter boot, as in Figures 1 and 5, the fertilizer outlets are positioned back of and at each side of the seed boot outlet, but at a somewhat higher level and within the width of tread of the following planter wheel. In operation, the planter runner will form a relatively deep furrow into which the seed is discharged. The soil on each side of that furrow is next engaged by the inclined, runner-like, under sides 28 of the two chutes of the fertilizer distributor unit. These form parallel and somewhat shallower furrows for the fertilizer and incidentally move a portion of the soil at each side of the seed furrow inwardly where it passes within the V-shaped channel 27 and is compressed over the deposited seed. Simultaneously, displaced soil flowing over the skirt pieces 26 falls back into the furrows where the fertilizer has just been deposited, leaving the deposited seed and fertilizer in the soil substantially in the positions shown in Figure 6. The planter covering wheel, of the usual ridge forming type, which follows, will next compress the band of soil in which the fertilizer and seed lie and the final positions of these in the so-called "hill" will be substantially as illustrated by Figure 7, with the fertilizer deposits lying slightly above and to both sides of the seed deposit and separated therefrom by a band of soil. Accordingly, there is no actual contact of seed and fertilizer, but the fertilizer is located in the most advantageous position for later supplying nourishment to the growing crop. Obviously, the distributor unit can be adjusted to deposit at lower levels than here shown.

There has accordingly been provided a novel arrangement of combined furrow forming, seed and fertilizer delivering and covering means, which cooperate to prevent undesirable contact or mixing of seed and fertilizer and to place these in the soil in the most desirable locations with respect to each other, and comprising a novel attachment adapted to be connected to a planter boot to form the above combination.

The preferred embodiment of the invention herein disclosed is, however, capable of modification within the scope of the following claims.

What is claimed is:

1. The combination of means for forming a furrow and depositing seed therein, a hollow member having a soil engaging base comprising laterally spaced runner-like chute portions connected by an arched portion straddling the seed furrow for covering said furrow as said chute portions are forming another furrow at each side and depositing fertilizer therein, and unitary means for packing the soil over all said furrows.

2. The combination with a planter boot having seed depositing means and a runner, of a unitary covering and fertilizer depositing device secured to the rear side of the boot comprising a casing having downwardly diverging soil engaging portions straddling the path of the runner, said portions constituting fertilizer discharging chutes.

3. The combination with a planter boot having seed depositing means and a runner, of a unitary covering and fertilizer depositing device secured to the rear side of the boot comprising a casing formed with an upper tubular portion to convey fertilizer and a lower portion formed with downwardly diverging soil engaging portions constituting furrow openers separated by an upwardly arched portion straddling the path of the runner, said soil engaging portions containing chutes communicating with the upper tubular portion and discharging fertilizer in the furrows opened by said soil engaging portions.

4. A fertilizer depositing attachment for planters comprising a casing having means for attaching it to a planter boot, said casing being formed with an upper central tubular portion constituting a conduit and with lower downwardly diverging branches separated by an upwardly arched space, the branches and arched portion constituting soil working means, the branches being formed as conduits communicating with the upper tubular portion.

5. A fertilizer depositing attachment for planters comprising a casing having means for attaching it to a planter boot, said casing comprising an upper chamber and a lower ground engaging portion comprising downwardly diverging conduit members leading from said chamber and shaped to constitute furrow forming runners, and a valve mounted on the casing for controlling flow of material from the upper chamber to the conduit members.

6. A fertilizer depositing attachment for planters comprising a casing adapted to be attached to a planter boot, said casing being formed with downwardly diverging furrow forming members having conduits therein and with an intermediate upwardly arched portion constituting a furrow closing means.

GEORGE M. KRIEGBAUM.
FRED F. BROOKS.
CLARENCE C. HAAS.